(12) United States Patent
Park

(10) Patent No.: US 10,083,003 B2
(45) Date of Patent: Sep. 25, 2018

(54) AUDIO VIDEO NAVIGATION (AVN) APPARATUS, VEHICLE, AND CONTROL METHOD OF AVN APPARATUS

(71) Applicant: HYUNDAI MOTOR COMPANY, Seoul (KR)

(72) Inventor: Jaeseok Park, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 544 days.

(21) Appl. No.: 14/680,981

(22) Filed: Apr. 7, 2015

(65) Prior Publication Data

US 2016/0110158 A1 Apr. 21, 2016

(30) Foreign Application Priority Data

Oct. 17, 2014 (KR) ........................ 10-2014-0140735

(51) Int. Cl.
| | |
|---|---|
| G06F 3/00 | (2006.01) |
| G06F 3/16 | (2006.01) |
| G10L 15/22 | (2006.01) |
| G06F 3/0484 | (2013.01) |
| G06F 3/0488 | (2013.01) |
| G01C 21/36 | (2006.01) |
| G06F 3/038 | (2013.01) |

(52) U.S. Cl.
CPC ......... *G06F 3/167* (2013.01); *G01C 21/3608* (2013.01); *G06F 3/038* (2013.01); *G06F 3/0488* (2013.01); *G06F 3/04842* (2013.01); *G10L 15/22* (2013.01); *G06F 2203/0381* (2013.01); *G10L 2015/221* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 2004/0143440 | A1* | 7/2004 | Prasad | G10L 15/22 704/270 |
| 2006/0259305 | A1* | 11/2006 | Pietruszka | G10L 15/22 704/275 |

(Continued)

FOREIGN PATENT DOCUMENTS

| | | |
|---|---|---|
| JP | 07-295784 A | 11/1995 |
| JP | 11-65739 A | 3/1999 |

(Continued)

OTHER PUBLICATIONS

Irene E. McDermott, Information Superhighway on the Actual Highway, Jun. 2011, Internet Express, pp. 7-11 (Year: 2011).*

(Continued)

*Primary Examiner* — Tam T Tran
(74) *Attorney, Agent, or Firm* — McDermott Will & Emery LLP

(57) ABSTRACT

An Audio Video Navigation (AVN) apparatus includes: a sound receiver configured to receive a speech from a user; a display unit configured to display a speech recognition screen in a speech recognition mode; and a controller configured to control, if the speech recognition mode is finished at a stage, the display unit to display a manipulation guide screen corresponding to the speech recognition screen displayed at the stage.

17 Claims, 9 Drawing Sheets

(56) References Cited

U.S. PATENT DOCUMENTS

| | | | | |
|---|---|---|---|---|
| 2008/0021598 A1* | 1/2008 | Daude | ............... | B60K 35/00 |
| | | | | 701/1 |
| 2010/0070932 A1* | 3/2010 | Hur | ............... | G09B 19/167 |
| | | | | 715/863 |
| 2010/0250249 A1* | 9/2010 | Fujino | ............... | H04N 7/147 |
| | | | | 704/235 |
| 2013/0179173 A1* | 7/2013 | Lee | ............... | G10L 15/22 |
| | | | | 704/275 |

FOREIGN PATENT DOCUMENTS

| | | |
|---|---|---|
| JP | 2001-125591 A | 5/2001 |
| JP | 2004-013094 A | 1/2004 |
| JP | 2010-026686 A | 2/2010 |
| KR | 10-2012-0025359 A | 3/2012 |

OTHER PUBLICATIONS

Andrew Forth, Connected vehicle technologies intelligence service, Aug. 1, 2013, Just-auto, pp. 3-84 (Year: 2013).*
Notice of Patent Allowance issued in corresponding Korean Patent Application No. 10-2014-0140735, dated Aug. 3, 2016; with partial English translation.

* cited by examiner

AUDIO VIDEO NAVIGATION (AVN) APPARATUS, VEHICLE, AND CONTROL METHOD OF AVN APPARATUS

CROSS-REFERENCE TO RELATED APPLICATION

This application claims the benefit of Korean Patent Application No. 10-2014-0140735, filed on Oct. 17, 2014 in the Korean Intellectual Property Office, the disclosure of which is incorporated herein by reference.

BACKGROUND

1. Technical Field

The present disclosure relates to an Audio Video Navigation (AVN) apparatus, a vehicle, and a control method of the AVN apparatus.

2. Description of the Related Art

A vehicle can perform, in addition to a driving function, additional functions for a user's convenience, such as an audio play function, a video play function, a navigation function, air-conditioning control, seat position control, lighting control, etc.

In order to perform such additional functions, the vehicle includes an Audio Video Navigation (AVN) apparatus into which an audio system, a multimedia system, and a navigation system are integrated to provide an audio service of streaming radio and playing Compact Disks (CDs), a video service of playing Digital Versatile Disks (DVDs), a navigation service providing a destination guide function, and the like.

The AVN apparatus displays a screen for providing a radio service, a screen for providing an audio service, a screen for providing a video service, or a screen for providing a navigation service, according to a users manipulation. Also, when providing the navigation service, the AVN apparatus displays various screens such as a destination search screen according to a user's manipulation.

Also, the AVN apparatus displays various speech recognition screens for a user according to the user's speech, as well as the user's manipulation, thereby providing a speech recognition service.

SUMMARY

Therefore, it is an aspect of the present disclosure to provide an Audio Video Navigation (AVN) apparatus of displaying, if a speech recognition screen is finished inevitably due to false recognition when a speech recognition service is being provided, a manipulation guide screen for guiding a user's manipulation according to a stage at which the speech recognition screen is finished, a vehicle, and a control method of the AVN apparatus.

Additional aspects of the disclosure will be set forth in part in the description which follows and, in part, will be obvious from the description, or may be learned by practice of the disclosure.

In accordance with one aspect of the present disclosure, an Audio Video Navigation (AVN) apparatus includes: a sound receiver configured to receive a speech from a user; a display unit configured to display a speech recognition screen in a speech recognition mode; and a controller configured to control, if the speech recognition mode is finished at a stage, the display unit to display a manipulation guide screen corresponding to the speech recognition screen displayed at the stage.

The display unit may display at least one screen among a destination search screen, a search result screen, a map/address confirmation screen, and a route selection screen, as the manipulation guide screen.

The controller may operate the speech recognition mode according to a user's input.

The controller may finish the speech recognition mode if a magnitude of the speech is smaller than a threshold value for a predetermined time period The AVN apparatus may further include a storage in which a plurality of commands are stored, wherein the controller may finish the speech recognition mode if a command included in the speech is identical to none of the commands stored in the storage.

The AVN apparatus may further include a sound unit configured to inform the user of a speech-receivable state.

The controller may finish the speech recognition mode, if the sound receiver receives the speech before the sound unit informs the user of the speech-receivable state.

The AVN apparatus may further include a communication unit connected to a mobile terminal through a network.

The controller may finish the speech recognition mode, if the communication unit receives a call signal.

The AVN apparatus may further include a communication unit connected to a camera module through a network, wherein the controller may finish the speech recognition mode, if the camera module is driven.

The AVN apparatus may further include a storage in which a plurality of commands are stored, wherein the display unit may display a first speech recognition screen, display a second speech recognition screen according to a destination search command from a user, display a third speech recognition screen according to a map/address confirmation command stored in the storage, and display a fourth speech recognition screen according to a route selection command stored in the storage.

The map/address confirmation command may include a command for selecting a destination candidate from among a plurality of destination candidates displayed on the second speech recognition screen.

The route selection command may include a command for selecting a map and an address displayed on the third speech recognition screen.

The display unit may be a touch screen device, and the manipulation may include a touch input.

In accordance with another aspect of the present disclosure, a vehicle includes: a sound receiver configured to receive a speech from a user; a display unit configured to display a speech recognition screen in a speech recognition mode; and a controller configured to control, if the speech recognition mode is finished at a stage, the display unit to display a manipulation guide screen corresponding to the speech recognition screen displayed at the stage.

In accordance with another aspect of the present disclosure, a control method of an Audio Video Navigation (AVN) apparatus includes: displaying a speech recognition screen according to a speech from a user in a speech recognition mode; and displaying, if the speech recognition mode is finished at a stage, a manipulation guide screen corresponding to the speech recognition screen displayed at the stage.

The control method may further include finishing the speech recognition mode, if a magnitude of the speech is smaller than a threshold value for a predetermined time period, before displaying the manipulation guide screen.

The AVN apparatus may include a storage in which a plurality of commands are stored, and the control method may further include finishing the speech recognition mode, if a command included in the speech is identical to none of the commands stored in the storage, before displaying the manipulation guide screen.

The AVN apparatus may further include a sound unit configured to inform the user of a speech-receivable state, and the control method may further include finishing the speech recognition mode, if the speech is received before the sound unit informs the user of the speech-receivable state, before displaying the manipulation guide screen.

The control method may further include finishing the speech recognition mode, if a call signal is received, before displaying the manipulation guide screen.

The AVN apparatus may connect to a camera module through a network, and the control method may further include finishing the speech recognition mode, if the camera module is driven, before displaying the manipulation guide screen.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
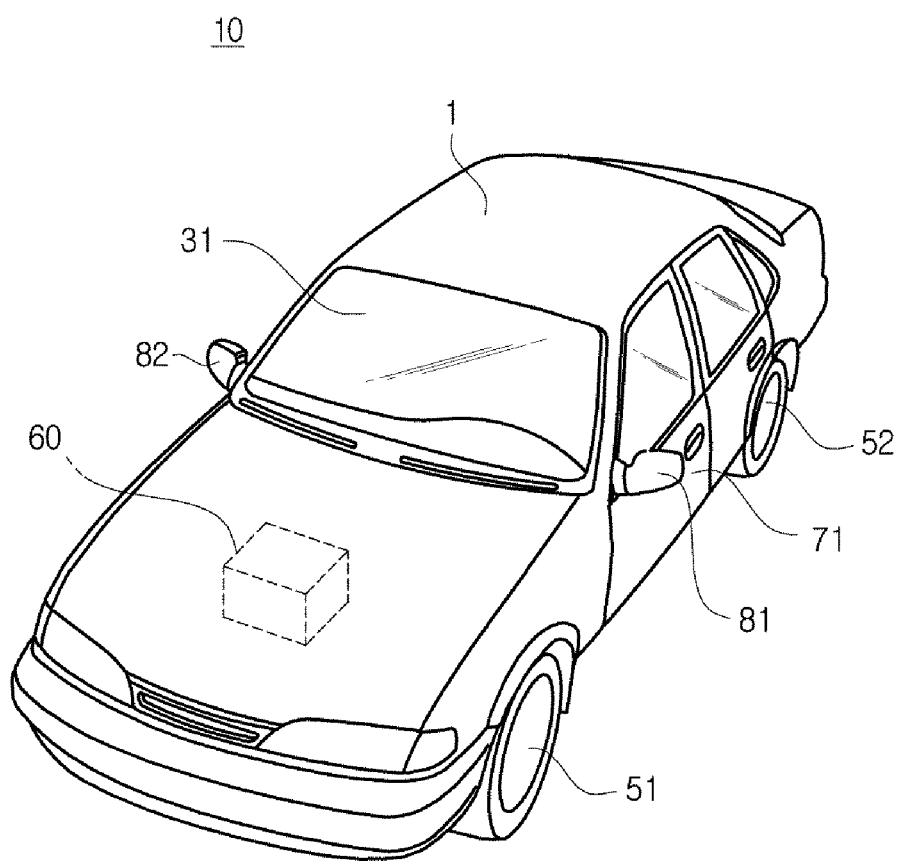
FIG. 1 shows an example of the exterior of a vehicle with an Audio Video Navigation (AVN) apparatus.

Purposes, specified advantages, and new features of the present disclosure will be apparent by referring to the following detailed description and embodiments described below in connection with the accompanying drawings. Also, like reference numerals refer to like elements throughout. In the following description, if it is determined that detailed descriptions for related art make the subject matter of the present disclosure obscure unnecessarily, the detailed descriptions will be omitted. In this specification, it will be understood that, although the terms first, second, etc. may be used herein to describe various components, these components should not be limited by these terms. These terms are only used to distinguish one component from another.

Figure 2:
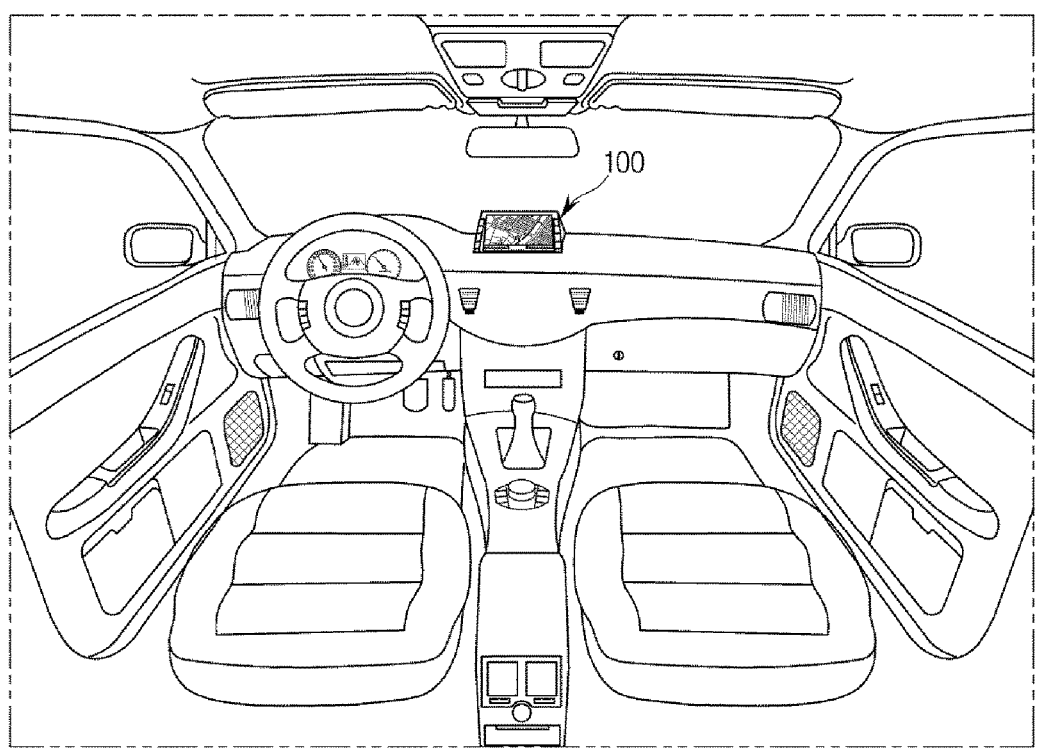
FIGS. 2 and 3 show the interior of a vehicle with an AVN apparatus.
Figure 3:
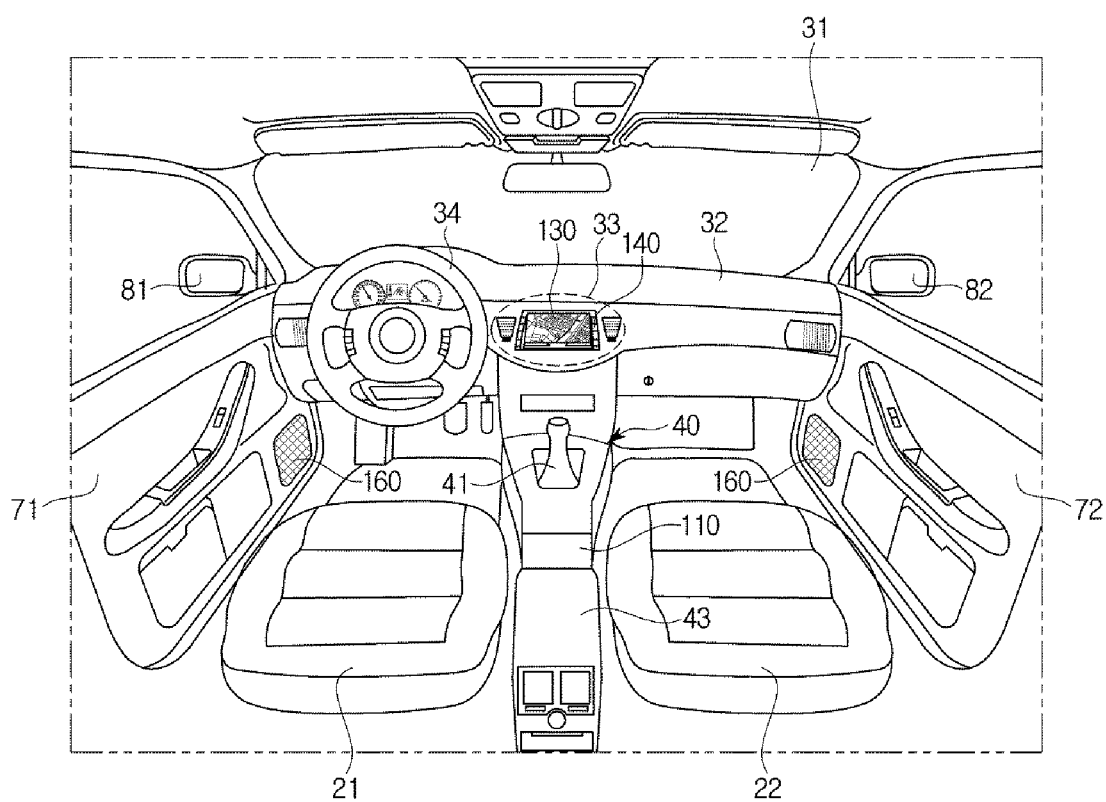

Hereinafter, a vehicle and an Audio Video Navigation (AVN) apparatus will be described with reference to FIGS. 1, 2, and 3. FIG. 1 shows an example of the exterior of a vehicle with an AVN apparatus, and FIGS. 2 and 3 show the interior of a vehicle with an AVN apparatus.

Referring to FIG. 1, a vehicle 10 according to an embodiment of the present disclosure may include a main body 1 forming an outer appearance of the vehicle 10, wheels 51 and 52 to move the vehicle 10, a driving apparatus 60 to rotate the wheels 51 and 52, doors 71 and 72 (see FIG. 3) to shield the interior of the vehicle 10 from the outside, a front glass 31 to provide a driver inside the vehicle 10 with a front view of the vehicle 10, and side-view mirrors 81 and 82 to provide the driver with rear views of the vehicle 10.

The wheels 51 and 52 may include front wheels 51 provided in the front part of the vehicle 10, and rear wheels 52 provided in the rear part of the vehicle 10. The driving apparatus 60 may provide rotatory power to the front wheels 51 or the rear wheels 52 so that the main body 1 moves forward or backward. The driving apparatus 60 may adopt an engine to burn fossil fuel to produce rotatory power, or a motor to receive power from a condenser (not shown) to produce rotatory power.

The doors 71 and 72 may be rotatably provided to the left and right of the main body 1 to allow the driver to open one of them and get into the vehicle 10. Also, the doors 71 and 72 shield the interior of the vehicle 10 from the outside when all of them close.

The front glass 31 may be provided in the upper, front part of the main body 1 to allow the driver inside the vehicle 10 to acquire a front view of the vehicle 10. The front glass 31 is also called a windshield glass.

The side-view mirrors 81 and 82 may include a left side-view mirror 81 provided to the left of the main body 1 and a right side-view mirror 82 provided to the right of the main body 1 to allow the driver inside the vehicle 10 to acquire side and rear views of the vehicle 10.

In addition, the vehicle 10 may include a proximity sensor to sense an obstacle or another vehicle behind or beside the vehicle 10, and a rain sensor to determine if it rains and to sense an amount of rainfall.

The vehicle 10 according to an embodiment of the present disclosure may include the AVN apparatus 100.

The AVN apparatus 100, into which an audio system, a video system, and a navigation system are integrated in the vehicle 10, may provide a radio service of streaming radio based on terrestrial radio signals, an audio play service of playing Compact Disks (CDs) and the like, a video play service of playing Digital Versatile Disks (DVDs), a navigation service of guiding a user to arrive at a destination, a call service of controlling reception of a call of a mobile terminal connected to the vehicle 10, etc. Also, the AVN apparatus 100 may provide a speech recognition service of receiving a user's speech, instead of a users manipulation, to provide the radio service, the audio play service, the video play service, the navigation service, and the call service, as described above.

Also, the AVN apparatus 100 may include a Universal Serial Bus (USB) port to connect to a portable multimedia apparatus, such as a Portable Multimedia Player (PMP), a MPEG Audio Layer-3 (MP3) player, a Personal Digital Assistants (PDA), etc. to reproduce audio and video files.

The AVN apparatus 100 may be removably installed inside the vehicle 10, as shown in FIG. 2, or fixedly installed inside the vehicle 10, as shown in FIG. 3.

A user may receive the radio service, the audio play service, the video play service, the navigation service, and the call service, through the AVN apparatus 100 installed inside the vehicle 10.

A center console 40 may be provided between a driver seat 21 and a passenger seat 22. The center console 40 is an area in which a gear lever 41 and a console box 43 to contain small things are located, between the driver seat 21 and the passenger seat 22.

Figure 4:
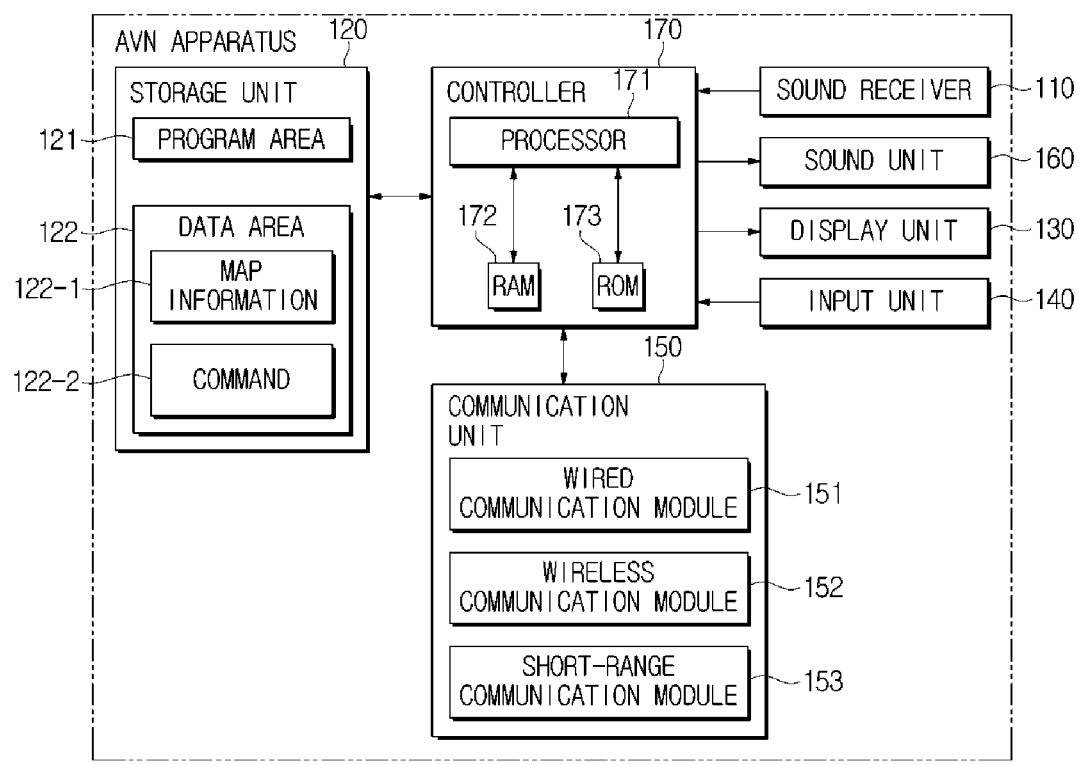
FIG. 4 is a control block diagram of an AVN apparatus according to an embodiment of the present disclosure.

Hereinafter, a configuration of the AVN apparatus 100 and a control method of the AVN apparatus 100 will be described with reference to FIGS. 3 and 4. FIG. 4 is a control block diagram of the AVN apparatus 100 according to an embodiment of the present disclosure.

Referring to FIGS. 3 and 4, the AVN apparatus 100 may include a sound receiver 110 to receive a speech from a user, a storage 120 to store data generated according to use of the AVN apparatus 100, a display unit 130 to display a screen, an input unit 140 to receive a manipulation from a user, a communication unit 150 to connect to a network, a sound unit 160 to output sound, and a controller 170 to control operations of the AVN apparatus 100.

Herein, "manipulation" means pressing or touching a button(s) provided on the input unit 140 in order to select an object or a tab displayed on the display unit 130 or to execute a desired item.

The sound receiver 110 may receive a speech from a user to generate electrical signals. The speech includes all kinds of sound as well as a human's voice. The speech can be represented as sound waves having the number of vibrations and a magnitude.

The sound receiver 110 may operate in a speech recognition mode.

The sound receiver 110 may be a microphone. The microphone may include a carbon type, a crystal type, a moving-coil type, a ribbon type, a condenser type, and a semiconductor microphone. However, the microphone is not limited to the aforementioned kinds of microphone, and may be implemented as any other kind of microphone.

The storage 120 may include a program area 121 to store programs related to functions and operations of the AVN apparatus 100, and a data area 122 to store data generated according to use of the AVN apparatus 100. The data area 122 may store map information 122-1 needed to provide a user with a navigation service, and commands 122-2 needed to determine a user's speech.

The map information 122-1 means navigation information stored in the AVN apparatus 100. The map information 122-1 may include terrain information (for example, existence of a underground or a tunnel), route information (for example, the locations of speed cameras, diverge points, and existence of a highway), traffic information (for example, real-time traffic data), and points of interest (for example, the locations of a restaurant A and a gas station B).

Each command 122-2 means a unit of data which the controller 170 uses to perform a control operation according to a users speech. For example, the commands 122-2 may include "Speech Recognition Mode", "<Ordinal Number>-th", "Yes/No", "Route <Number>", "Call <Name>", "Previous Screen", etc. The commands 122-2 will be described in more detail in the following description related to the controller 170.

Meanwhile, in the embodiment illustrated in FIG. 4, the controller 170 includes Read Only Memory (ROM) 173 that stores control programs, and Random Access Memory (RAM) 173 that temporarily stores signals/data received from the outside of the AVN apparatus 100 or is used as a workspace for operations performed in the AVN apparatus 100. However, the ROM 172 and RAM 173 may be included in the storage 120.

Also, the storage 120 may be implemented as a separate component from the controller 170, as shown in FIG. 4. However, the storage 120 including the ROM 172 and RAM 173 may be included in the controller 170. In this case, the storage 120 may be connected to other components constituting the controller 170 on a board or in a device.

The display unit 130 may be installed in a center fascia 33 that is the center area of a dash board 32. The display unit 130 may display a screen to induce a user's manipulation or a users speech input according to a mode.

Hereinafter, the screen to induce a user's manipulation is referred to as an "AVN screen", and the screen to induce a users speech input is referred to as a "speech recognition screen".

The display unit 130 may be implemented as a touch screen device. If the display unit 130 is implemented as a touch screen device, the display unit 130 can perform the function of the input unit 140 which will be described later, together with a display function.

In the following description, the display unit 130 is assumed to be a touch screen device. In this case, a user's "manipulation" may be a users "touch input". The AVN screen will be described with reference to FIG. 5, and the speech recognition screen will be described with reference to FIG. 6, below.

Figure 5:
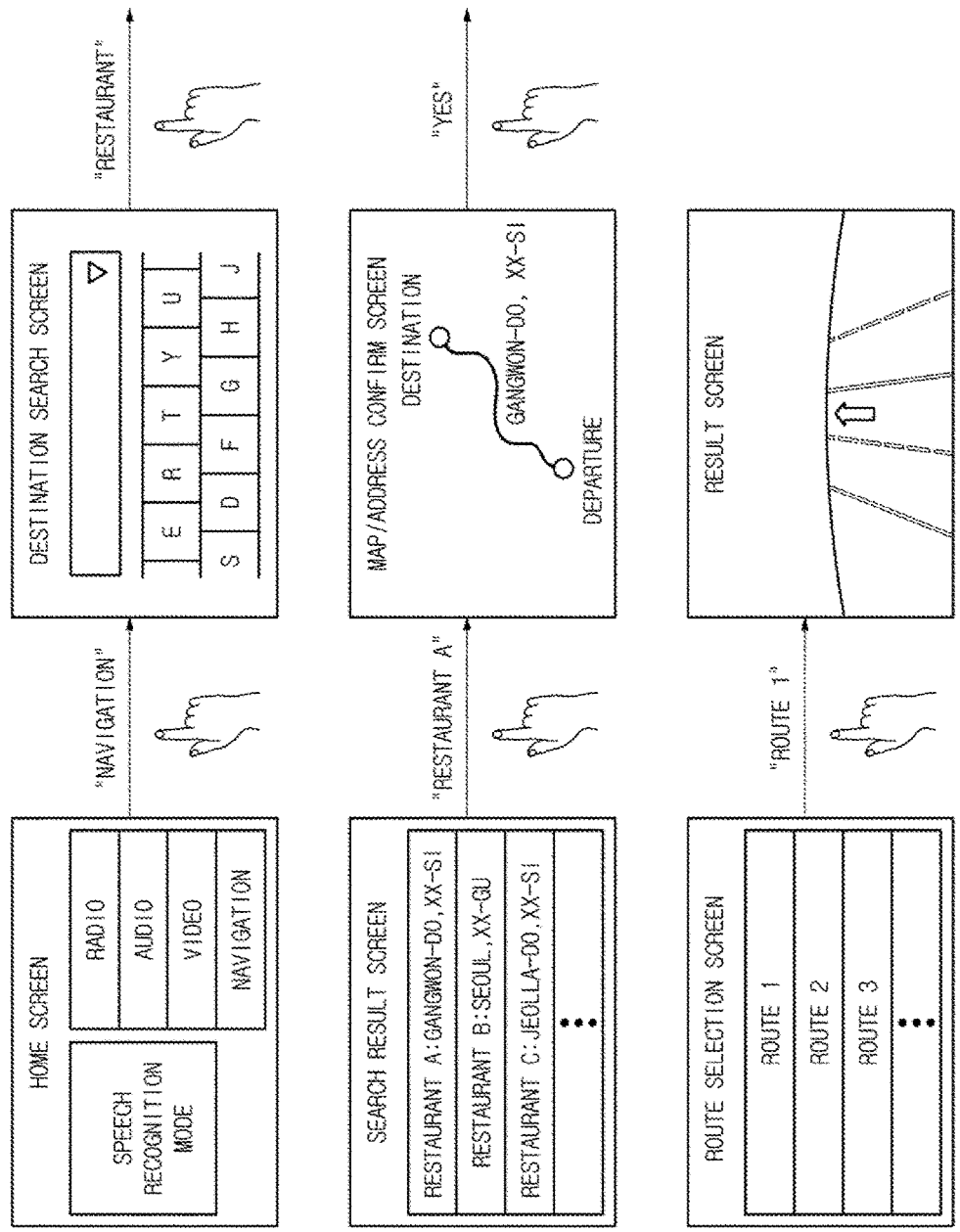
FIG. 5 shows examples of AVN screens that are respectively displayed according to a user's touch inputs.

FIG. 5 shows examples of AVN screens that are respectively displayed according to a user's touch inputs at individual stages.

Referring to FIG. 5, the display unit 130 (see FIG. 4) may display a home screen. The home screen may include a "Speech Recognition Mode" tab, a "Radio" tab, an "Audio" tab, a "Video" tab, and a "Navigation" tab.

If a user touches the "Speech Recognition Mode" tab, the display unit 130 may enter a speech recognition mode to display a speech recognition screen, and if the user touches the "Radio" tab, the display unit 130 may display an AVN screen to provide the user with the radio service.

Also, if the user touches the "Audio" tab, the display unit 130 may display an AVN screen to provide the user with the audio service, and if the user touches the "Navigation" tab, the display unit 130 may output an AVN screen to provide the user with the navigation service.

Also, the display unit 130 may display a call screen to provide a user with a call service.

If the user touches the "Navigation" tab, the display unit 130 may display a destination search screen according to the users touch input. The destination search screen is a screen to receive the user's touch input of designating a destination. The display unit 130 may further display a keyboard to enable the user to input characters, on the destination search screen.

Successively, if the user touches a destination (for example, "Restaurant") on the destination search screen, the display unit 130 may display a search result screen. The search result screen is a screen that displays one or more destination candidates (for example, "Restaurant A", "Restaurant B", and "Restaurant C") corresponding to the destination input on the destination search screen. The display unit 130 may receive the user's touch input of selecting one of the destination candidates.

If the user selects a destination candidate (for example, "Restaurant A"), the display unit 130 may display a map/address confirmation screen. The map/address confirmation screen is a screen that displays address information and map information corresponding to the destination candidate (that is, "Restaurant A") selected on the search result screen. The display unit 130 may receive the user's touch input of confirming the address information and the map information.

If the user touches "Confirm" or "Yes", the display unit 130 may display a route selection screen. The route selection screen is a screen that displays one or more route candidates (for example, "Route 1", "Route 2", and "Route 3") to arrive at the destination candidate displayed on the map/address confirmation screen. The display unit 130 may receive the users touch input of selecting one of the route candidates.

If the user touches "First" or "Route 1", the display unit 130 may display a route guide screen according to the "Route 1".

Meanwhile, the above-described examples correspond to a case in which a user's manipulation is a touch input; however, the users manipulation is not limited to a touch input. For example, the users manipulation may be an input of pressing a button type or wheel type input unit that is separated from the display unit 130.

Figure 6:
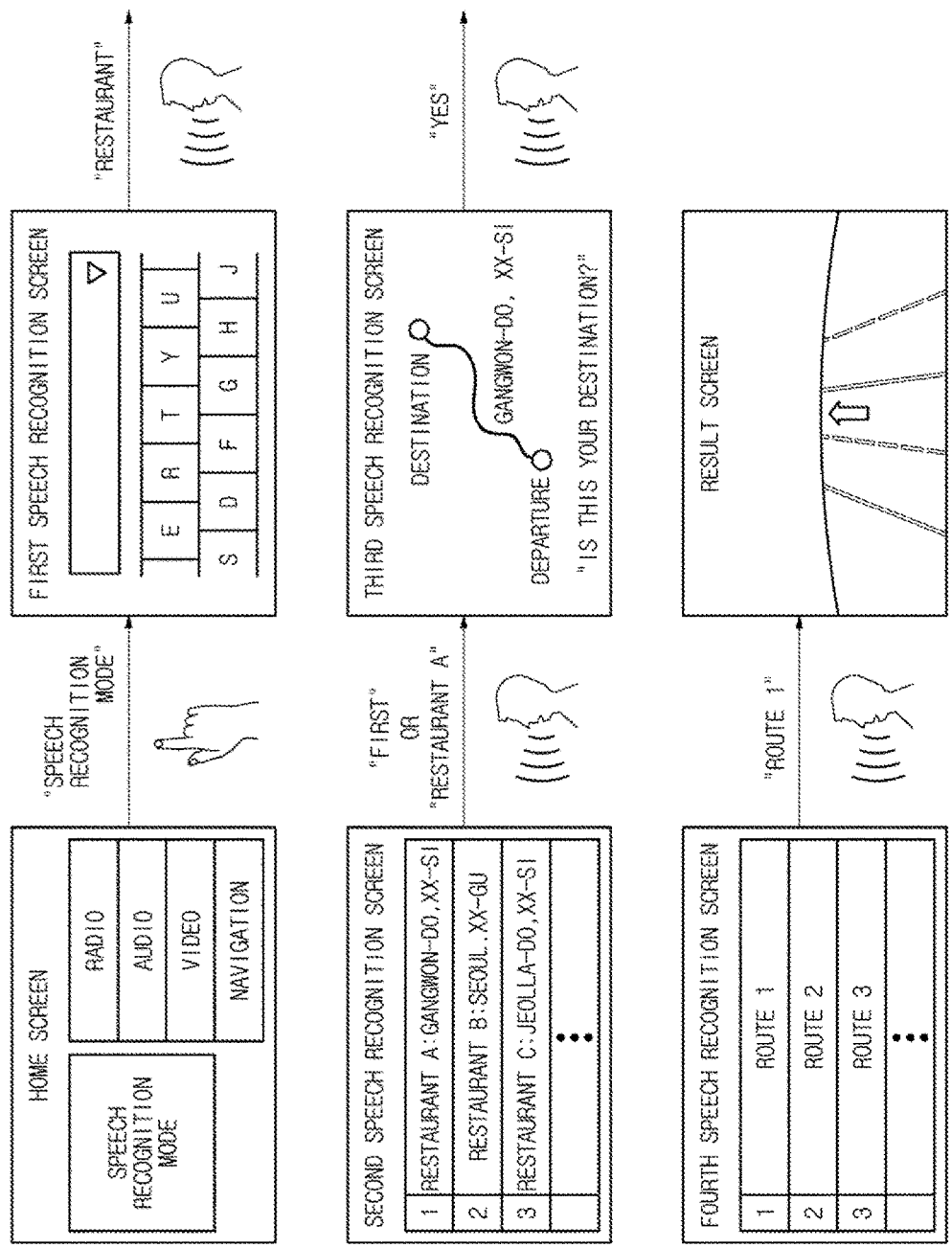
FIG. 6 shows examples of speech recognition screens that are respectively displayed according to a user's speeches.

FIG. 6 shows examples of speech recognition screens that are respectively displayed according to a user's speeches.

Referring to FIG. 6, the display unit 130 may display a home screen. The home screen may include a "Speech Recognition Mode" tab, a "Radio" tab, an "Audio" tab, a "Video" tab, and a "Navigation" tab.

If a user touches the "Speech Recognition Mode" tab, the display unit 130 may enter a speech recognition mode to display a speech recognition screen. More specifically, the display unit 130 may display a first speech recognition screen. The first speech recognition screen is a screen to receive the user's speech of designating a destination, and corresponds to the destination search screen among the AVN screens described above with reference to FIG. 5. For example, the display unit 130 may display a guidance message such as "Please Speak Your Destination" in order to receive a speech from the user.

If a speech is received from the user, the display unit 130 may display a second speech recognition screen according to the content of the user's speech. For example, if a speech "Restaurant" is received from the user, the second speech recognition screen is a screen that displays one or more destination candidates corresponding to "Restaurant". The screen corresponds to the search result screen among the AVN screens described above. In this case, the display unit 130 may receive the user's speech of selecting one of the destination candidates.

Then, if a speech is received from the user, the display unit 130 may display a third speech recognition screen according to the content of the user's speech. For example, if a speech "First" or "Restaurant A" is received from the user, the third speech recognition screen includes a screen that displays address information and map information corresponding to a destination candidate corresponding to the speech "First" or "Restaurant A", and a screen (for example, a screen showing a message "Is This Your Destination?") that requests the user to confirm the destination. The third speech recognition screen corresponds to the map/address confirmation screen among the AVN screens described above. In this case, the display unit 130 may receive the user's speech of confirming the address information and map information.

Then, if a speech is received from the user, the display unit 130 may display a fourth speech recognition screen according to the content of the user's speech. For example, if a speech "Confirm" or "Yes" is received from the user, the fourth speech recognition screen is a screen that displays one or more route candidates to arrive at the destination candidate displayed on the third speech recognition screen. The fourth speech recognition screen corresponds to the route selection screen among the AVN screens described above. The display unit 130 may receive the users speech of selecting one of the route candidates.

Successively, if a speech is received from the user, the display unit 130 may display a route guide screen according to the content of the user's speech. For example, if a speech "First" or "Route 1" is received from the user, the display unit 130 may display a route guide screen according to the route 1. The route guide screen corresponds to the route guide screen among the AVN screens described above.

Meanwhile, if the user touches the "Speech Recognition Mode" tab, the display unit 130 may further display various speech recognition screens, as well as the first to fourth speech recognition screens, according to the users speeches.

Also, if the AVN apparatus 100 connects to a camera module through the communication unit 150, the display unit 130 may display an image received from the camera module. Also, the display unit 130 may receive signals from various devices connected to the communication unit 150, other than the camera module, and display various screens or images based on the received signals.

The display unit 130 may be implemented with a Plasma Display Panel (PDP), Light Emitting Diodes (LEDs), or a Liquid Crystal Display (LCD).

Also, the display unit 130 may be a 3Dimensional (3D) display that can display 3D images.

The display unit 130 may be implemented as a touch screen device as described above. If the display unit 130 is implemented as a touch screen device, the display unit 30 may perform the function of the input unit 140. The touch screen device may be implemented with a resistive touch screen panel or a capacitive touch screen panel. Also, the touch screen device may be implemented with a touch screen panel using ultrasonic waves or infrared rays.

Referring again to FIG. 4, the input unit 140 may allow the user to input various control commands for controlling the AVN apparatus 100, while seeing the display unit 130 that can display a plurality of screens including an AVN screen and a speech recognition screen.

The user may select various tabs displayed on an AVN screen through the input unit 140.

The input unit 140 may be a touch screen device, as described above; however, the input unit 140 is not limited to a touch screen device. For example, the input unit 140 may be a button type device or a remote controller that is separated from the display unit 130.

The communication unit 150 may receive current location information of the vehicle 10 (see FIG. 1) transmitted from Global Positioning System (GPS), map information transmitted from a navigation management server, and terrestrial broadcasting signals transmitted from a repeater, through a wired/wireless network.

Figure 7:
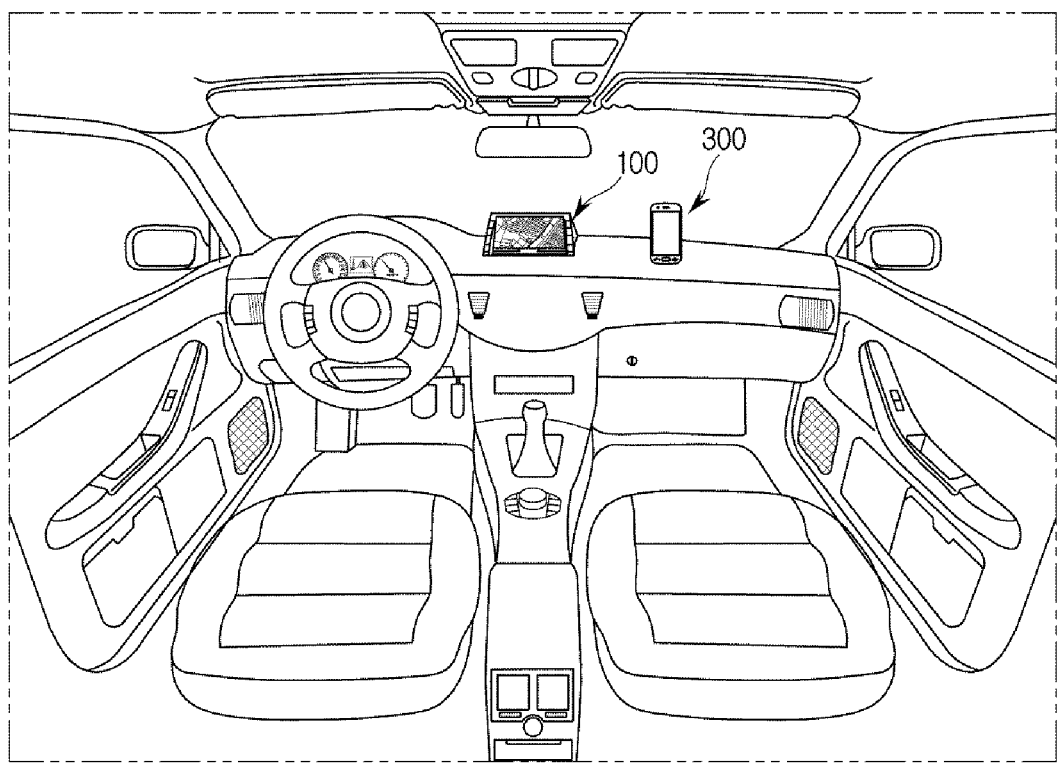
FIG. 7 shows an example of an AVN apparatus that connects to a mobile terminal through a short-range communication network.

Also, as shown in FIG. 7, the communication unit 150 may include a USB port and/or a Bluetooth module to which a portable device for multimedia, such as a PMP, a MP3 player, and a PDA, can be connected to reproduce audio/video files.

FIG. 7 shows an example of an AVN apparatus that connects to a mobile terminal through a short-range communication network.

Referring to FIG. 7, the communication unit 150 may include a Bluetooth module to connect to a mobile terminal through a network. In this case, the communication unit 150 may receive a call signal from the mobile terminal. The call signal is a notification signal informing that the mobile terminal has an incoming call.

Also, the communication unit 150 may include a Controller Area Network (CAN) module to connect to the camera module (not shown) through a vehicle network. In this case, the communication unit 150 may receive images from the camera module, and the received images may be displayed through the display unit 130.

Also, the communication unit 150 may include one of a wired communication module 151 to connect to a wired network, a wireless communication module 152 to connect to a wireless network, and a short-range communication module 153. Alternatively, the communication unit 150 may include a combination of the wired communication module 151, the wireless communication module 152, and the short-range communication module 153.

The wired communication module 151 may include a wired Ethernet module, a Wide Area Network (WAN) module, a Value Added Network (VAN) module, and a Controller Area Network (CAN) module.

The wireless communication module 152 may connect to a wireless network at a place where an Access Point (AP) is installed to thus connect to the AP. The wired communication module 152 may support IEEE802.11x.

The short-range communication module 153 may include a Bluetooth module, a Bluetooth low-energy module, an Infrared Data Association (IrDA) module, a Wireless Fidelity (Wi-Fi) module, a Ultra Wideband (UWA) module, a Near Field Communication (NFC) module, and a Zigbee module.

Referring again to FIG. 4, the sound unit 160 may reproduce sound included in a call signal or an image according to the control of the controller 170 which will be described later, and output the sound for the user.

Also, the sound unit 160 may inform the user of a speech-receivable state.

For example, the sound unit 160 may output beep sound, after the display unit 130 displays a speech recognition screen, to inform the user of a speech-receivable state.

The sound unit 130 may be a speaker or an amplifier.

The controller 170 may control operations of the AVN apparatus 100 according to a pre-stored control program or a users input.

The controller 170 according to an embodiment of the present disclosure may operate a speech recognition mode, a navigation mode for providing a user with a navigation service, a radio mode for providing a radio service, an audio mode for providing an audio service, a video mode for providing a video service, and a call mode for providing a call service, according to a user's input applied on a home screen.

If the navigation mode operates, the controller 170 may provide the user with the navigation service, as shown in FIG. 5, and if the speech recognition mode operates, the controller 170 may provide the user with the speech recognition service, as shown in FIG. 6.

Also, if the speech recognition mode is finished at a specific stage according to a predetermined setting, the controller 170 may control the display unit 130 to display an AVN screen corresponding to the current speech recognition screen.

In this case, the speech recognition screen may be referred to as a foreground layer, and the AVN screen may be referred to as a background layer.

Figure 8:
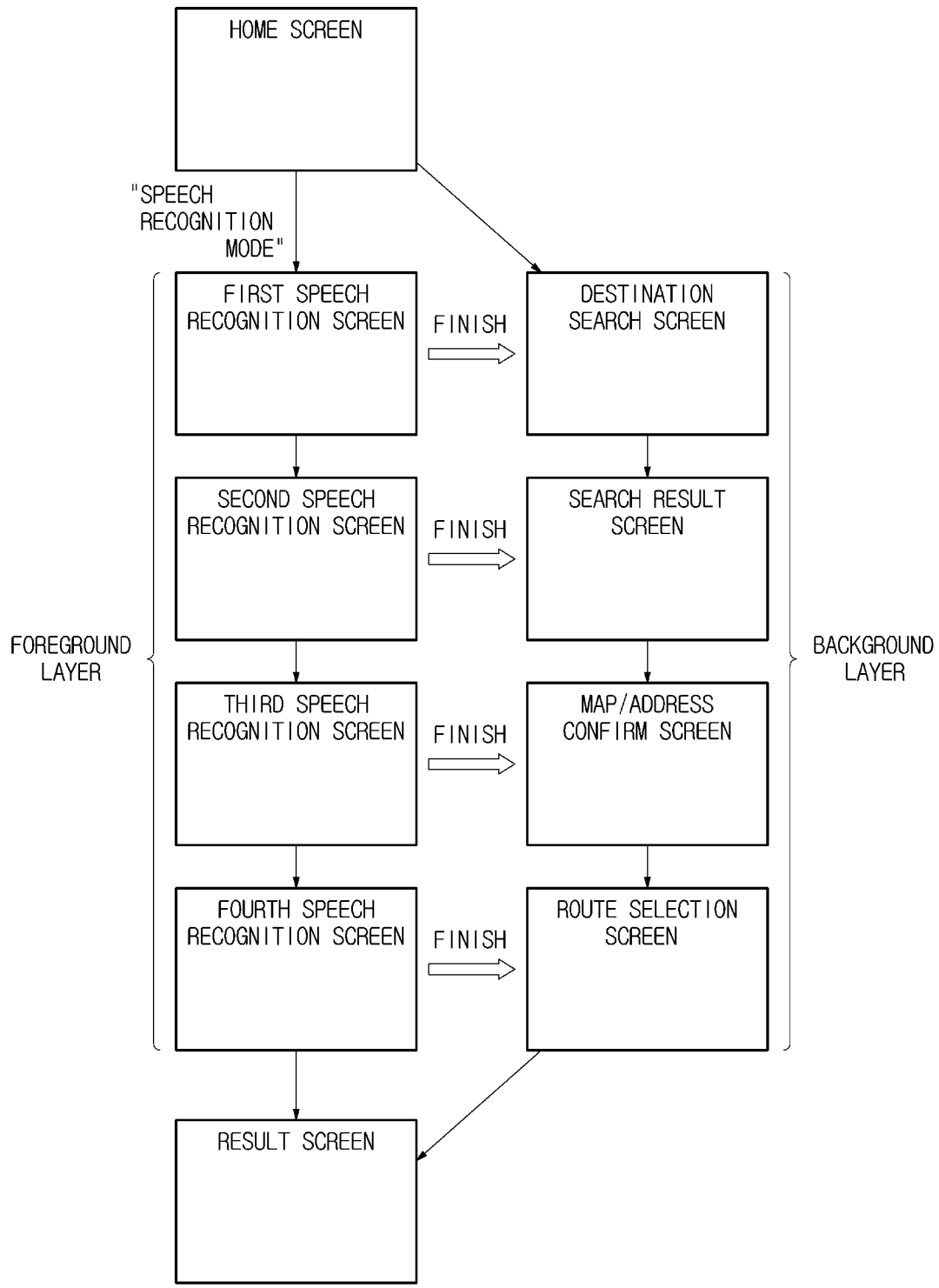
FIG. 8 is a view for describing a control operation of a controller when a speech recognition screen is finished.

Hereinafter, a control operation of the controller 170 when the speech recognition mode operates will be described with reference to FIG. 8. FIG. 8 is a view for describing a control operation of the controller 170 when a speech recognition screen is finished.

Referring to FIGS. 4 and 8, if a user selects a "Speech Recognition Mode" tab on a home screen displayed by the display unit 130, the controller 130 may operate the speech recognition mode.

If the speech recognition mode operates, a foreground layer may overlap a background layer on the display unit 130. That is, a speech recognition screen overlaps an AVN screen so that the speech recognition screen which is a foreground layer is displayed for the user.

If a first speech recognition screen is displayed, the controller 170 may receive a speech from the user through the sound receiver 110.

If the sound receiver 100 receives a speech normally, the controller 170 may control the display unit 130 to display a second speech recognition screen according to the received speech. However, at this stage, if the speech recognition mode is finished according to a predetermined setting, the controller 170 may control the display unit 130 to display an AVN screen (that is, a destination search screen) corresponding to the first speech recognition screen. That is, the controller 170 may convert a foreground layer into a background layer.

After the second speech recognition screen is displayed, likewise, the controller 170 may control the display unit 130 to display a third speech recognition screen according to a received speech. However, at this stage, if the speech recognition mode is finished according to a predetermined setting, the controller 170 may control the display unit 130 to display an AVN screen (that is, a search result screen) corresponding to the second speech recognition screen. That is, the controller 170 may convert a foreground layer into a background layer.

After the third speech recognition screen is displayed, likewise, the controller 170 may control the display unit 130 to display a fourth speech recognition screen according to a received speech. However, at this stage, if the speech recognition mode is finished according to a predetermined setting, the controller 170 may control the display unit 130 to display an AVN screen (that is, a map/address confirmation screen) corresponding to the third speech recognition screen. That is, the controller 170 may convert a foreground layer into a background layer.

After the fourth speech recognition screen is displayed, likewise, the controller 170 may control the display unit 130 to display a result screen according to a received speech. However, at this stage, if the speech recognition mode is finished according to a predetermined setting, the controller 170 may control the display unit 130 to display an AVN screen (that is, a route selection screen) corresponding to the fourth speech recognition screen. That is, the controller 170 may convert a foreground layer into a background layer.

Meanwhile, if the speech recognition mode is finished at a specific stage according to a predetermined setting so that layer conversion into a background layer occurs, the next AVN screen may be displayed according to a user's manipulation (for example, a user's touch input).

Accordingly, although the speech recognition mode is finished at a certain stage according to a predetermined setting, a background layer (that is, an AVN screen) corresponding to the current foreground layer (that is, a speech recognition screen) is displayed without returning to the home screen.

Also, the controller 170 may finish the speech recognition mode according to a predetermined setting.

More specifically, when the magnitude of a speech received through the sound receiver 110 for a predetermined time period is smaller than a threshold value, the controller 170 may finish the speech recognition mode.

Also, when a command included in a speech received from the sound receiver 11 is identical to none of the commands stored in the storage 120, the controller 170 may finish the speech recognition mode.

For example, it is assumed that the display unit 130 displays the first speech recognition screen, and the storage 120 stores "Restaurant", "Gas Station", "Beauty Shop", and "Bakery" as destination search commands corresponding to the first speech recognition screen. In this case, when the sound receiver 110 receives a speech (for example, "Hong Gil Dong") that is identical to none of the commands "Restaurant", "Gas Station", "Beauty Shop", and "Bakery" from a user, the controller 170 may finish the speech recognition mode.

As another example, it is assumed that the display unit 130 displays the second speech recognition screen, and the storage 120 stores "Restaurant <Name>" as a map/address confirmation command corresponding to the second speech recognition screen. In this case, when the sound receiver 110 receives a speech (for example, "Gas Station A") that is not identical to the command "Restaurant <Name>" from a user, the controller 170 may finish the speech recognition mode.

As another example, it is assumed that the display unit 130 displays the third speech recognition screen, and the storage 120 stores "Yes" and "No" as commands corresponding to the third speech recognition screen. In this case, when the sound receiver 110 receives a speech (for example, "I Don't Know") that is identical to none of the commands "Yes" and "No" from a user, the controller 170 may finish the speech recognition mode.

As another example, it is assumed that the display unit 130 displays the fourth speech recognition screen, and the storage 120 stores "Route <Number>" and "<Ordinal Number>-th" as commands corresponding to the fourth speech recognition screen. In this case, when the sound receiver 110 receives a speech (for example, "Destination") that is identical to none of the commands "Route <Number>" and "<Ordinal Number>-th" from a user, the controller 170 may finish the speech recognition mode.

Also, when the sound receiver 110 receives a speech from the user before the sound unit 160 informs the user of a speech-receivable state, the controller 170 may finish the speech recognition mode.

For example, when the sound receiver 110 receives a speech whose magnitude is greater than a threshold value before beep sound is output, the controller 170 may finish the speech recognition mode.

Also, when the communication unit 150 receives a call signal from a mobile terminal, the controller 170 may finish the speech recognition mode.

Also, when a camera module connected to the AVN apparatus 100 through a network is driven, the controller 170 may finish the speech recognition mode. The case in which the camera module is driven may be the case in which the vehicle 10 is in reverse gear.

Also, the controller 170 may finish the speech recognition mode according to the user's input.

Referring again to FIG. 4, the controller 170 may include a processor 171, Read Only Memory (ROM) 173 that stores control programs for controlling the AVN apparatus 100, and Random Access Memory (RAM) 172 that store signals/data received from the outside of the AVN apparatus 100 or is used as a storage area for various tasks that are performed by the AVN apparatus 100.

Also, the controller 170 may include a graphic processing board (not shown) with the processor 171, the RAM 172, and the ROM 173, on a separate circuit board electrically connected to the controller 170.

The processor 171, the RAM 172, and the ROM 173 may be connected to each other through internal buses.

Also, the controller 170 can be used as a term indicating a component that includes the processor 171, the RAM 171, and the ROM 173.

Also, the controller 170 can be used as a term indicating a component that includes the processor 171, the RAM 171, the ROM 173, and the processing board (not shown).

Figure 9:
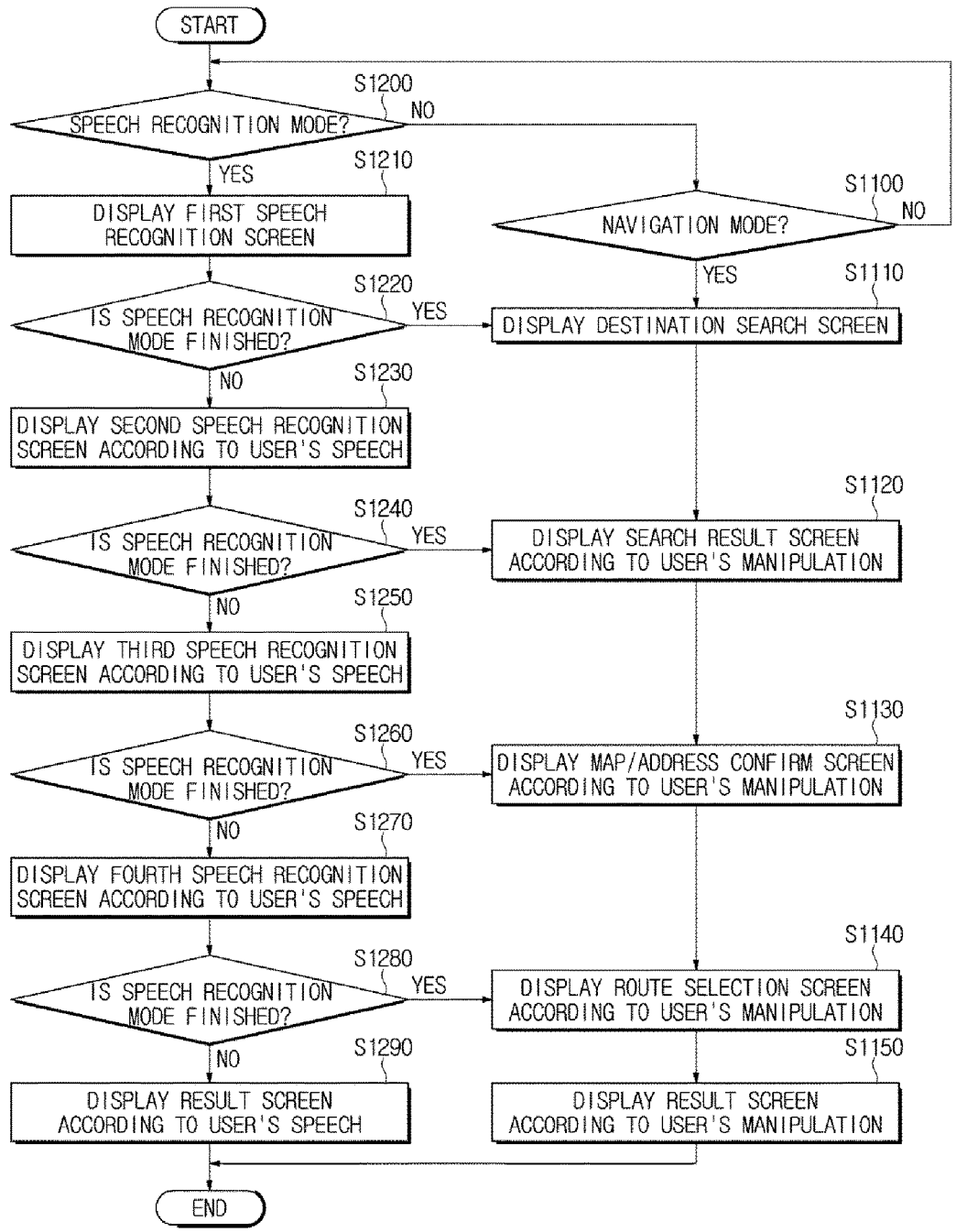
FIG. 9 is a flowchart illustrating a control method of an AVN apparatus.

Hereinafter, a control method of the AVN apparatus 100 will be described with reference to FIG. 9. FIG. 9 is a flowchart illustrating a control method of the AVN apparatus 100.

Referring to FIG. 9, the AVN apparatus 100 may operate a speech recognition mode or a navigation mode, in operations S1100 and S1200.

The speech recognition mode or the navigation mode may operate according to a user's manipulation. For example, one of the speech recognition mode and the navigation mode may operate according to a user's touch input applied on a home screen.

If the navigation mode operates ("Yes" in operation S1100), the AVN apparatus 100 may display a destination search screen in order to receive destination information from the user, in operation S1110. For example, the AVN apparatus 100 may display a keyboard to allow the user to input characters.

Successively, the AVN apparatus 100 may display a search result screen according to the users manipulation, in operation S1120. For example, if the user selects a "Restaurant" tab as a destination, or types "Restaurant" through the keyboard, the AVN apparatus 100 may display "Restaurant A", "Restaurant B", and "Restaurant C" as destination candidates related to "Restaurant".

Successively, the AVN apparatus 100 may display a map/address confirmation screen according to the users manipulation, in operation S1130. For example, if the user selects "Restaurant A" from among the destination candidates "Restaurant A", "Restaurant B", and "Restaurant C", the AVN apparatus 100 may display address information and map information corresponding to the "Restaurant A".

Then, the AVN apparatus 100 may display a route selection screen according to the users manipulation, in operation S1140. For example, if the user selects "Yes", the AVN apparatus 100 may display "Route 1", "Route 2", and "Route 3" as one or more route candidates to arrive at the destination candidate displayed on the map/address confirmation screen.

Successively, the AVN apparatus 100 may display a result screen according to the users manipulation, in operation S1150. For example, if the user inputs "First" or "Route 1" to the AVN apparatus 100, the AVN apparatus 100 may display a route guide screen corresponding to the "Route 1".

Meanwhile, if the speech recognition mode operates ("Yes" in operation S1200), the AVN apparatus 100 may display a first speech screen to receive the user's speech of designating a destination, in operation S1210. For example, the AVN apparatus 100 may display a message "Please Speak Your Destination". In this case, the AVN apparatus 100 may output sound corresponding to the message "Please Speak Your Destination", through the sound unit 160, while displaying the message "Please Speak Your Destination".

Successively, the AVN apparatus 100 may determine whether to finish the speech recognition mode, in operation S1220.

If a magnitude of a speech received through the sound receiver 110 for a predetermined time period is smaller than a threshold value, the AVN apparatus 100 may finish the speech recognition mode.

Also, if a command included in a speech received through the sound receiver 11 is identical to none of commands stored in the storage 120, the AVN apparatus 100 may finish the speech recognition mode.

Also, if the sound receiver 110 receives a speech from the user before the sound unit 160 informs the user of a speech-receivable state, the controller 170 may finish the speech recognition mode.

Also, if the communication unit 150 receives a call signal from a mobile terminal, the AVN apparatus 100 may finish the speech recognition mode.

Also, if a camera module connected to the AVN apparatus 100 through a network is driven, the AVN apparatus 100 may finish the speech recognition mode.

If the speech recognition mode is finished ("Yes" in operation S1220), the AVN apparatus 100 may convert the current screen into an AVN screen (that is, a destination search screen) corresponding to the first speech recognition screen, in operation S1110. In this case, the AVN apparatus 100 may display the next AVN screen according to the users manipulation, in operation S1120.

However, if the speech recognition mode is not finished ("No" in operation S1220), the AVN apparatus 100 may display a second speech recognition screen according to the user's speech, in operation S1230. For example, if the AVN apparatus 100 receives the users speech "Restaurant", the AVN apparatus 100 may display "Restaurant A", "Restaurant B", and "Restaurant C" as one or more destination candidates corresponding to the "Restaurant". In this case, likewise, the AVN apparatus 100 may output sound for the individual destination candidates "Restaurant A", "Restaurant B", and "Restaurant C", through the sound unit 160, while displaying the destination candidates "Restaurant A", "Restaurant B", and "Restaurant C".

Thereafter, the AVN apparatus 100 may determine whether to finish the speech recognition mode, in operation S1240.

Likewise, if the speech recognition mode is finished ("Yes" in operation S1240), the AVN apparatus 100 may convert the current screen into an AVN screen (that is, a search result screen) corresponding to the second speech recognition screen, in operation S1120. In this case, the AVN apparatus 100 may display the next AVN screen according to the user's manipulation, in operation S1130.

However, if the speech recognition mode is not finished ("No" in operation S1240), the AVN apparatus 100 may display a third speech recognition screen according to the user's speech, in operation S1250. For example, if the AVN apparatus 100 receives the user's speech "Restaurant A", the AVN apparatus 100 may display map information and address information corresponding to the "Restaurant A". In this case, likewise, the AVN apparatus 100 may output sound for the map information and the address information, through the sound unit 160, while displaying the map information and the address information.

Then, the AVN apparatus 100 may determine whether to finish the speech recognition mode, in operation S1260.

Likewise, if the speech recognition mode is finished ("Yes" in operation S1260), the AVN apparatus 100 may convert the current screen into an AVN screen (that is, a map/address confirmation screen) corresponding to the third speech recognition screen, in operation S1130. In this case, the AVN apparatus 100 may display the next AVN screen according to the users manipulation, in operation S1140.

However, if the speech recognition mode is not finished ("No" in operation S1260), the AVN apparatus 100 may display a fourth speech recognition screen according to the user's speech, in operation S1270. For example, if the AVN apparatus 100 receives the users speech "Yes", the AVN apparatus 100 may display one or more route candidates to arrive at "Restaurant A".

In this case, likewise, the AVN apparatus 100 may display a speech for the individual route candidates, through the sound unit 160, while displaying the route candidates.

Thereafter, the AVN apparatus 100 may determine whether to finish the speech recognition mode, in operation S1280.

Likewise, if the speech recognition mode is finished ("Yes" in operation S1280), the AVN apparatus 100 may convert the current screen into an AVN screen (that is, a route selection screen) corresponding to the fourth speech recognition screen, in operation S1140. In this case, the AVN apparatus 100 may display the next AVN screen according to the user's manipulation, in operation S1150.

However, if the speech recognition mode is not finished ("No" in operation S1280), the AVN apparatus 100 may display a result screen according to the user's speech, in operation S1290. For example, if the AVN apparatus 100 receives the user's speech "Route 1", the AVN apparatus 100 may display a route guide screen corresponding to the "Route 1". In this case, the AVN apparatus 100 may output sound for the route guide screen, through the sound unit 160, while displaying the route guide screen.

Meanwhile, FIG. 9 relates to the case in which the control method of the AVN apparatus 100 is finished in the navigation mode; however, the control method of the AVN apparatus 100 may be finished in the radio mode, in the audio mode, in the video mode, or in the call mode.

Therefore, according to the AVN apparatus 100 and the control method of the AVN apparatus 100 as described above, although a speech recognition screen is finished at any stage, a manipulation guide screen corresponding to the speech recognition screen that has been finished can be displayed.

Also, according to the AVN apparatus 100 and the control method of the AVN apparatus 100 as described above, a user can input information he/she intended to input to the speech recognition screen that has been finished, to the manipulation guide screen.

Meanwhile, some of the components which constitute the AVN apparatus 100 according to the embodiment as described above may be implemented by modules. The term "module" means a software or hardware component such as a Field Programmable Gate Array (FPGA) or an Application Specific Integrated Circuit (ASIC) and the modules each perform assigned functions. However, the modules are not limited to software or hardware. The modules may be configured in an addressable storage medium, or may be configured to run on at least one processor.

Therefore, as an example, the modules include: components such as software components, object-oriented software components, class components, and task components; processors, functions, attributes, procedures, sub-routines, segments of program codes, drivers, firmware, microcodes, circuits, data, databases, data structures, tables, arrays, and variables. The functions provided by the components and the modules may be combined into fewer components and/or modules may be separated into additional components and modules. In addition, the components and modules may execute one or more Central Processing Units (CPUs) in a device.

Meanwhile, the AVN apparatus 100 and the control method thereof may be embodied as computer-readable code in computer-readable recording medium. The computer-readable recording medium includes any kind of recording device that store data readable by a computer system. For example, the computer-readable recording medium may be ROM, RAM, a magnetic tape, a magnetic tape, a magnetic disk, flash memory, or an optical data storage device. In addition, the computer-readable recording medium may be distributed to computer systems over a network, in which computer readable codes may be stored and executed in a distributed manner.

The aforementioned descriptions are only for illustrative purposes, and it will be apparent that those skilled in the art can make various modifications thereto without changing the technical spirit and essential features of the present disclosure. Thus, it should be understood that the exemplary embodiments described above are merely for illustrative purposes and not for limitation purposes in all aspects. For example, each component described as a single type can be implemented in a distributed type, and components described as distributed can be implemented in a combined form.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An Audio Video Navigation (AVN) apparatus, comprising:
    a microphone receiving a speech from a user;
    a display displaying a speech recognition screen in a speech recognition mode; and
    a controller controlling the display to display a manipulation guide screen corresponding to the speech recognition screen displayed at a stage when the controller determines that the speech recognition mode is finished at the stage when a command included in the speech is identical to none of the commands stored in a storage,
    wherein the command included in the speech corresponds to the speech recognition screen.

2. The AVN apparatus according to claim 1, wherein the display displays at least one screen among a destination search screen, a search result screen, a map/address confirmation screen, and a route selection screen, as the manipulation guide screen.

3. The AVN apparatus according to claim 1, wherein the controller operates the speech recognition mode according to a user's input.

4. The AVN apparatus according to claim 1, further comprising a sound unit configured to inform the user of a speech-receivable state.

5. The AVN apparatus according to claim 4, wherein the controller finishes the speech recognition mode, if the microphone receives the speech before the sound unit informs the user of the speech-receivable state.

6. The AVN apparatus according to claim 1, further comprising a communication unit connected to a mobile terminal through a network.

7. The AVN apparatus according to claim 6, wherein the controller finishes the speech recognition mode, if the communication unit receives a call signal.

8. The AVN apparatus according to claim 1, further comprising a communication unit connected to a camera module through a network,
    wherein the controller finishes the speech recognition mode, if the camera module is driven.

9. The AVN apparatus according to claim 1, further comprising a storage in which a plurality of commands are stored,
    wherein the display displays a first speech recognition screen, displays a second speech recognition screen according to a destination search command from a user, displays a third speech recognition screen according to a map/address confirmation command stored in the storage, and displays a fourth speech recognition screen according to a route selection command stored in the storage.

10. The AVN apparatus according to claim 9, wherein the map/address confirmation command includes a command for selecting a destination candidate from among a plurality of destination candidates displayed on the second speech recognition screen.

11. The AVN apparatus according to claim 9, wherein the route selection command includes a command for selecting a map and an address displayed on the third speech recognition screen.

12. The AVN apparatus according to claim 1, wherein the display is a touch screen device, and the manipulation includes a touch input.

13. A vehicle comprising:
    a microphone receiving a speech from a user;
    a display displaying a speech recognition screen in a speech recognition mode; and
    a controller controlling the display to display a manipulation guide screen corresponding to a speech recognition screen displayed at a stage when the controller determined the speech recognition mode is finished at the stage when a command included in the speech is identical to none of the commands stored in a storage,
    wherein the command included in the speech corresponds to the speech recognition screen.

14. A control method of an Audio Video Navigation (AVN) apparatus, comprising:
    displaying, by a display, a speech recognition screen according to a speech from a user in a speech recognition mode; and
    displaying, by the display, a manipulation guide screen corresponding to the speech recognition screen displayed at a stage when a controller determines that the speech recognition mode is finished at the stage when a command included in the speech is identical to none of the commands stored in a storage,
    wherein the command included in the speech corresponds to the speech recognition screen.

15. The control method according to claim 14, wherein the AVN apparatus further comprises a sound unit configured to inform the user of a speech-receivable state,
    further comprising finishing the speech recognition mode, if the speech is received before the sound unit informs the user of the speech-receivable state, before displaying the manipulation guide screen.

16. The control method according to claim 14, further comprising finishing the speech recognition mode, if a call signal is received, before displaying the manipulation guide screen.

17. The control method according to claim 14, wherein the AVN apparatus connects to a camera module through a network,
    further comprising finishing the speech recognition mode, if the camera module is driven, before displaying the manipulation guide screen.

* * * * *